(12) United States Patent  
John Wilson et al.

(10) Patent No.: US 11,006,360 B2  
(45) Date of Patent: May 11, 2021

(54) MULTI-BEAM PHYSICAL DOWNLINK CONTROL CHANNEL (PDCCH) MONITORING DURING CONNECTED MODE DISCONTINUOUS RECEPTION (CDRX) OPERATION

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, San Diego, CA (US); Xiao Feng Wang, San Diego, CA (US); Juan Montojo, San Diego, CA (US); Kaushik Chakraborty, San Diego, CA (US); Wooseok Nam, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 16/046,403

(22) Filed: Jul. 26, 2018

(65) Prior Publication Data

US 2019/0037495 A1    Jan. 31, 2019

Related U.S. Application Data

(60) Provisional application No. 62/537,901, filed on Jul. 27, 2017.

(51) Int. Cl.
*H04W 52/02* (2009.01)
*H04B 7/0408* (2017.01)
(Continued)

(52) U.S. Cl.
CPC ...... *H04W 52/0216* (2013.01); *H04B 7/0408* (2013.01); *H04B 7/0695* (2013.01);
(Continued)

(58) Field of Classification Search
CPC .... H04B 7/0408; H04B 7/0695; H04B 7/088; H04W 52/0216; H04W 52/0229;
(Continued)

(56) References Cited

U.S. PATENT DOCUMENTS

2016/0192433 A1    6/2016  Deenoo et al.
2016/0381563 A1*  12/2016  Khalek ................. H04W 16/14
                                                              455/454
(Continued)

FOREIGN PATENT DOCUMENTS

WO    2017155138 A1    9/2017

OTHER PUBLICATIONS

Ericsson: "Beam Management in C-DRX", 3GPP Draft; R1-1711018 Beam Management in C-DRX, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017 (Jun. 26, 2017), XP051300218, 2 pages, Retrieved from the Internet: URL:http://www.3gpp.org/ftp/Meetings_3GPP_SYNC/RAN1/Docs/ [retrieved on Jun. 26, 2017].

(Continued)

*Primary Examiner* — Khoa Huynh
(74) *Attorney, Agent, or Firm* — Patterson + Sheridan, L.L.P.

(57) ABSTRACT

Aspects of the present disclosure relate to techniques for multibeam PDCCH monitoring during CDRX operations. A BS may determine a configuration of one or more beams for a UE to monitor for receiving a downlink control channel from the BS, wherein the configuration is based, at least in (Continued)

part, on a monitoring window since the subframe in which the downlink control channel (e.g., PDCCH), indicates an initial UL, DL, or SL use data transmission for the UE. The BS may transmit, to the UE, an indication of the configuration. A UE may perform corresponding operations and may monitor one or more beams based on the received configuration.

24 Claims, 13 Drawing Sheets

(51) Int. Cl.
*H04B 7/08* (2006.01)
*H04B 7/06* (2006.01)
*H04W 56/00* (2009.01)
*H04W 72/04* (2009.01)
*H04W 72/14* (2009.01)

(52) U.S. Cl.
CPC ........ *H04B 7/088* (2013.01); *H04W 52/0229* (2013.01); *H04W 56/001* (2013.01); *H04W 72/042* (2013.01); *H04W 72/0446* (2013.01); *H04W 72/14* (2013.01)

(58) Field of Classification Search
CPC . H04W 56/001; H04W 72/04; H04W 72/042; H04W 72/0446; H04W 72/14; H04W 76/28
See application file for complete search history.

(56) References Cited

U.S. PATENT DOCUMENTS

| | | |
|---|---|---|
| 2017/0118792 A1 | 4/2017 | Rico et al. |
| 2017/0230780 A1 | 8/2017 | Chincholi et al. |
| 2017/0251518 A1 | 8/2017 | Agiwal et al. |
| 2019/0268787 A1* | 8/2019 | Guan .................... H04W 24/04 |

OTHER PUBLICATIONS

Huawei et al: "Consideration on DRX with Beam Management", 3GPP Draft; R2-1706721 Consideration on DRX with Beam Management V1.1, 3rd Generation Partnership Project (3GPP), Mobile Competence Centre, 650, Route Des Lucioles, F-06921 Sophia-Antipolis Cedex; vol. RAN WG2, No. Qingdao, China; May 27, 2017-May 29, 2017, Jun. 26, 2017 (Jun. 26, 2017), XP051301221, 4 pages, Retrieved from the Internet: URL:http://www.3gpp.org/ftp/Meetings_3GPP_SVNC/RAN2/Docs/ [retrieved on Jun. 26, 2017].
Interdigital Communications: "C-DRX Beam Management Aspects", 3GPP Draft; R2-1701187 (NR SI AI10214) C-DRX Beam Management Aspects, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017 (Feb. 12, 2017), pp. 1-3, XP051211879, Retrieved from the Internet: URL:http://www.3gpp.org/ftp/Meetings_3GPP_SYNC/RAN2/Docs/ [retrieved on Feb. 12, 2017].
International Search Report and Written Opinion—PCT/US2018/044084—ISA/EPO—dated Oct. 16, 2018.

* cited by examiner

MULTI-BEAM PHYSICAL DOWNLINK CONTROL CHANNEL (PDCCH) MONITORING DURING CONNECTED MODE DISCONTINUOUS RECEPTION (CDRX) OPERATION

CROSS-REFERENCE TO RELATED APPLICATIONS

This application claims the benefit of U.S. Application Ser. No. 62/537,901 entitled "MULTI-BEAM PHYSICAL DOWNLINK CONTROL CHANNEL (PDCCH) MONITORING DURING CONNECTED MODE DISCONTINUOUS RECEPTION (CDRX) OPERATION," which was filed on Jul. 27, 2017. The aforementioned application is herein incorporated by reference in its entirety.

INTRODUCTION

Aspects of the present disclosure relate to wireless communications, and more particularly, multi-beam monitoring during connected mode discontinuous reception (CDRX) operation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure improve robustness for control channel monitoring by a UE.

Certain aspects of the present disclosure provide a method for wireless communication that may be performed, for example, by a BS. The method generally includes determining a configuration of one or more beams for a user equipment (UE) to monitor for receiving a downlink control channel from the BS, wherein the configuration is based, at least in part, on a number of consecutive subframes after a subframe in which the downlink control channel indicates an initial uplink, downlink, or sidelink user data transmission for the UE, and transmitting, to the UE, an indication of the configuration.

Also described herein are embodiments of an apparatus comprising a non-transitory memory comprising executable instructions and a processor in data communication with the memory and configured to execute the instructions to cause the apparatus to determine a configuration of one or more beams for a user equipment (UE) to monitor for receiving a downlink control channel from the apparatus, wherein the configuration is based, at least in part, on a monitoring window starting after a subframe in which the downlink control channel indicates an initial uplink, downlink, or sidelink user data transmission for the UE and transmit, to the UE, an indication of the configuration.

Certain aspects of the present disclosure provide a method for wireless communication that may be performed, for example, by a UE. The method generally includes receiving, from a base station (BS), a configuration of one or more beams to monitor for receiving a downlink control channel from the BS, wherein the configuration is based, at least in part, on a number of consecutive subframes after a subframe in which the downlink control channel indicates an initial uplink, downlink, or sidelink user data transmission for the UE, and monitoring the one or more beams in accordance with the configuration.

Also described herein are embodiments of an apparatus comprising a non-transitory memory comprising executable instructions and a processor in data communication with the memory and configured to execute the instructions to cause the apparatus to receive, from a base station (BS), a configuration of one or more beams to monitor for receiving a downlink control channel from the BS, wherein the configuration is based, at least in part, on a monitoring window starting after a subframe in which the downlink control channel indicates an initial uplink, downlink or sidelink user data transmission for the apparatus and monitor the one or more beams in accordance with the configuration.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
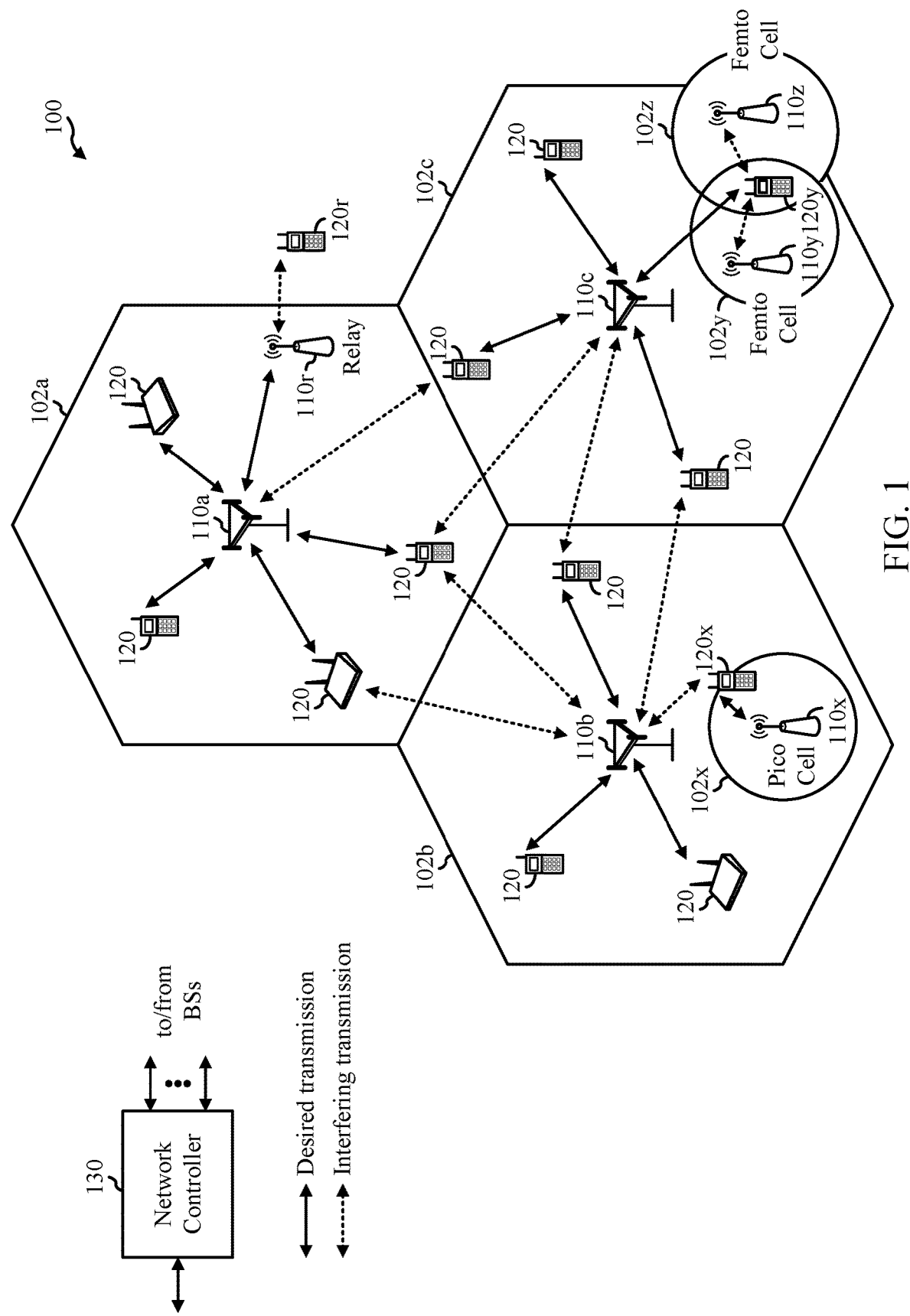
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure improve the robustness for control channel monitoring by a UE. A UE operating in an mmW system may move or change orientation between different ON portions of a CDRX operation. Accordingly, a receive beam used by a UE to monitor a downlink control channel (e.g., PDCCH) in a first ON period may need to be updated in a later-occurring ON period. Aspects of the present disclosure associate one or more beams to monitor by the UE as a function of the DRX cycle. Stated otherwise, based, at least in part, on a periodicity of the DRX cycle (e.g., short or long), the UE may be configured with one or more beams to monitor the downlink control channel. In certain aspects, the periodicity of the DRX cycle may be inferred based, at least in part, on a monitoring window, which may correspond to an amount of time that has passed since a last indication of an initial UL/DL or SL data transmission for the UE. In certain aspects, the periodicity of the DRX cycle may be inferred based, at least in part, on a monitoring window corresponding to the number of consecutive subframes since the last indication of an initial UL/DL or SL data transmission for the UE.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH. In such systems, the BS and the UE may communicate using beam-formed transmissions.

Aspects of the present disclosure improve robustness for control channel monitoring by a UE. In an mmW system, monitoring a DL control channel becomes increasingly important during CDRX operations. In certain wireless systems, such as LTE, a UE may wake up a few slots before a scheduled ON time. The UE may perform measurements for channel estimation such that the UE may receive data during the ON period of the CDRX cycle. In an mmWave environment, a UE may have moved (even slightly) or changed its orientation from a last ON period. Accordingly, a UE may not be able to receive a same transmit beam in subsequent ON periods. Because of movement or a change in orientation, it may not be clear what beam(s) the UE should monitor when it wakes up during an ON period.

Aspects presented herein provide methods and apparatus associated with signaling of a monitoring configuration for use during CDRX operation.

As described herein, the monitoring configuration may include (1) one or more beams the UE should monitor and (2) a configuration of when and how to use the one or more beams to monitor the downlink control channel. The one or more beams the UE monitors during a short CDRX cycle may be different than the one or more beams the UE monitors during a long DRX cycle. Additionally, according to aspects, the UE configuration may indicate that the UE monitor the downlink control channel in a CDRX cycle of a first periodicity using one or more beams in certain slots (e.g., even slots) and monitor the downlink control channel using one or more different beams in other slots (e.g., odd slots). According to aspects, the UE may be configured to monitor the downlink control channel in a CDRX cycle of a second, longer periodicity using one or more different beams as compared to the beams used to monitor the downlink control channel of the first periodicity.

As will be described in more detail herein, the configuration of beams the UE monitors may be based on a time that has elapsed since receiving a last subframe indicating initial uplink/downlink or sidelink (UL/DL or SL) user data transmission for this MAC entity. The number of subframes that have elapsed may indicate the elapsed amount of time. If the number of consecutive subframes is less than threshold number of subframes, the UE may be operating in a short CDRX cycle. If the number of consecutive subframes is greater than or equal to the threshold number of subframes, the UE may be operating in a long CDRX cycle. When using time as a threshold value, for illustrative purposes only, the threshold amount of time may be, 1 second.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

Figure 8:
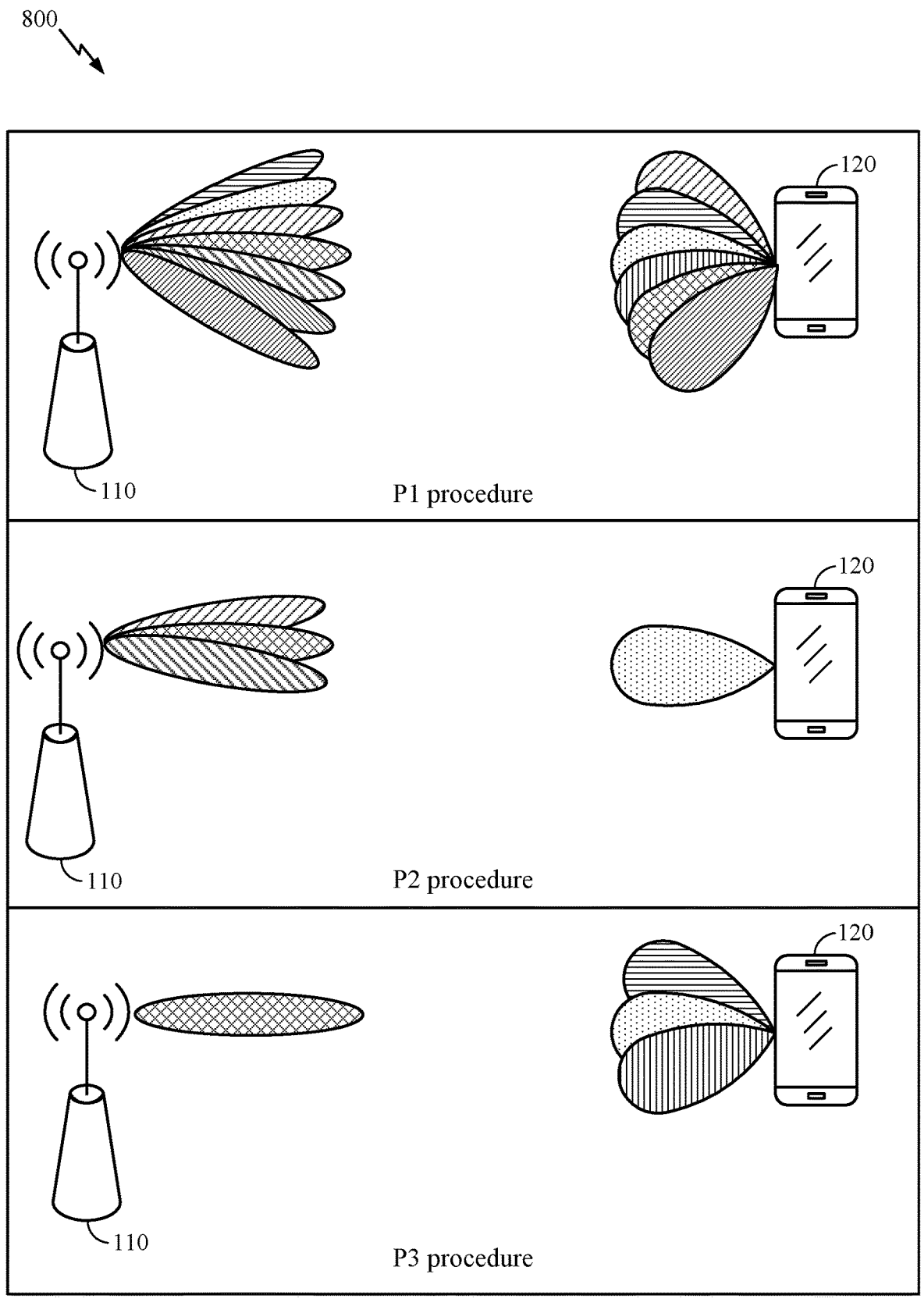
FIG. 8 illustrates an example of a P1, P2, and P3 procedure, in accordance with certain aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently monitor a downlink control channel in in an mmW system, the UEs 120 may be configured to perform the operations 1100 and methods described herein. BS 110 may comprise a transmission reception point (TRP), Node B (NB), 5G NB, access point (AP), new radio (NR) BS, Master BS, primary BS, etc.). The BS 110 may be configured to perform the operations 1000 and the methods described herein.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
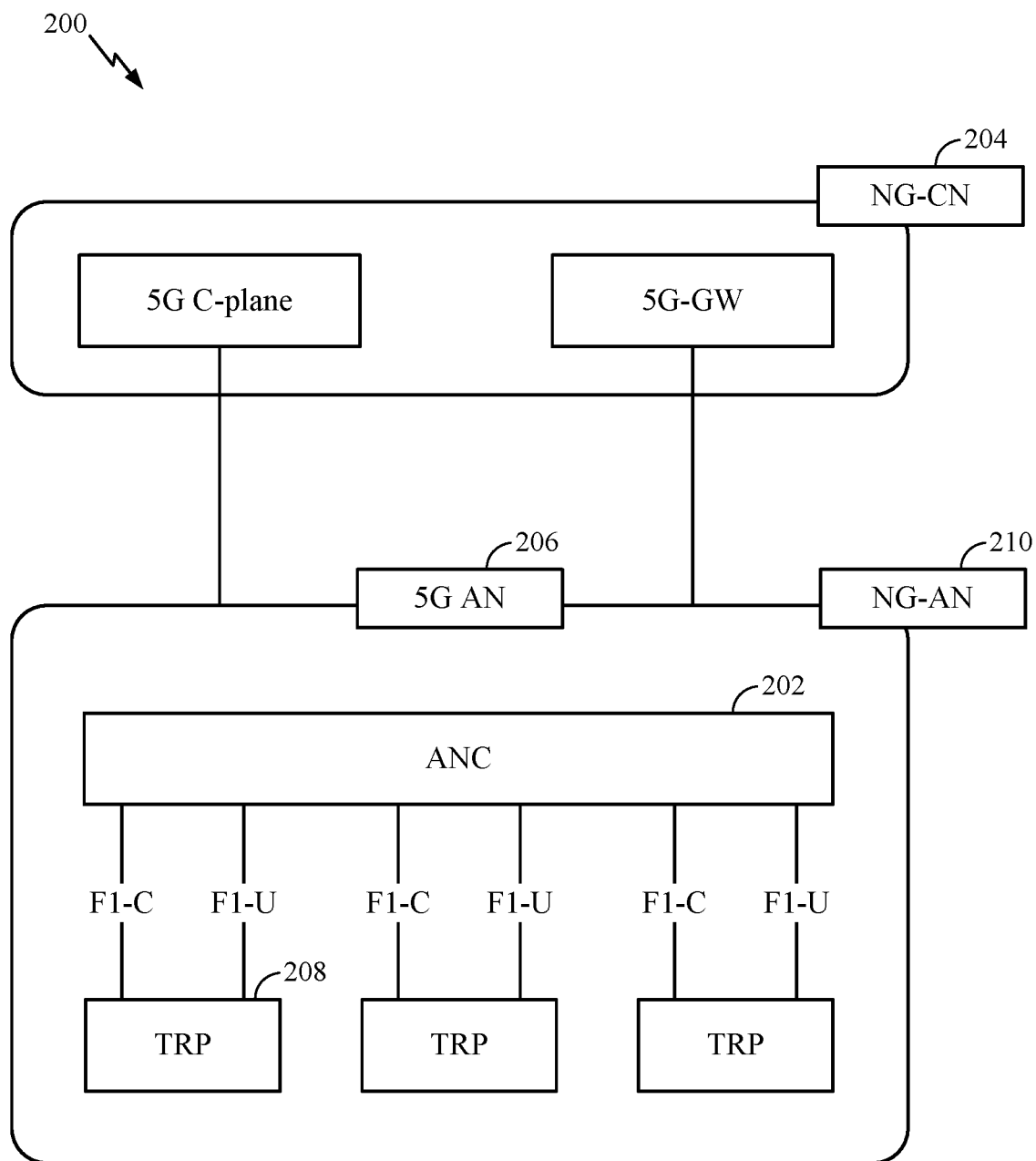
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
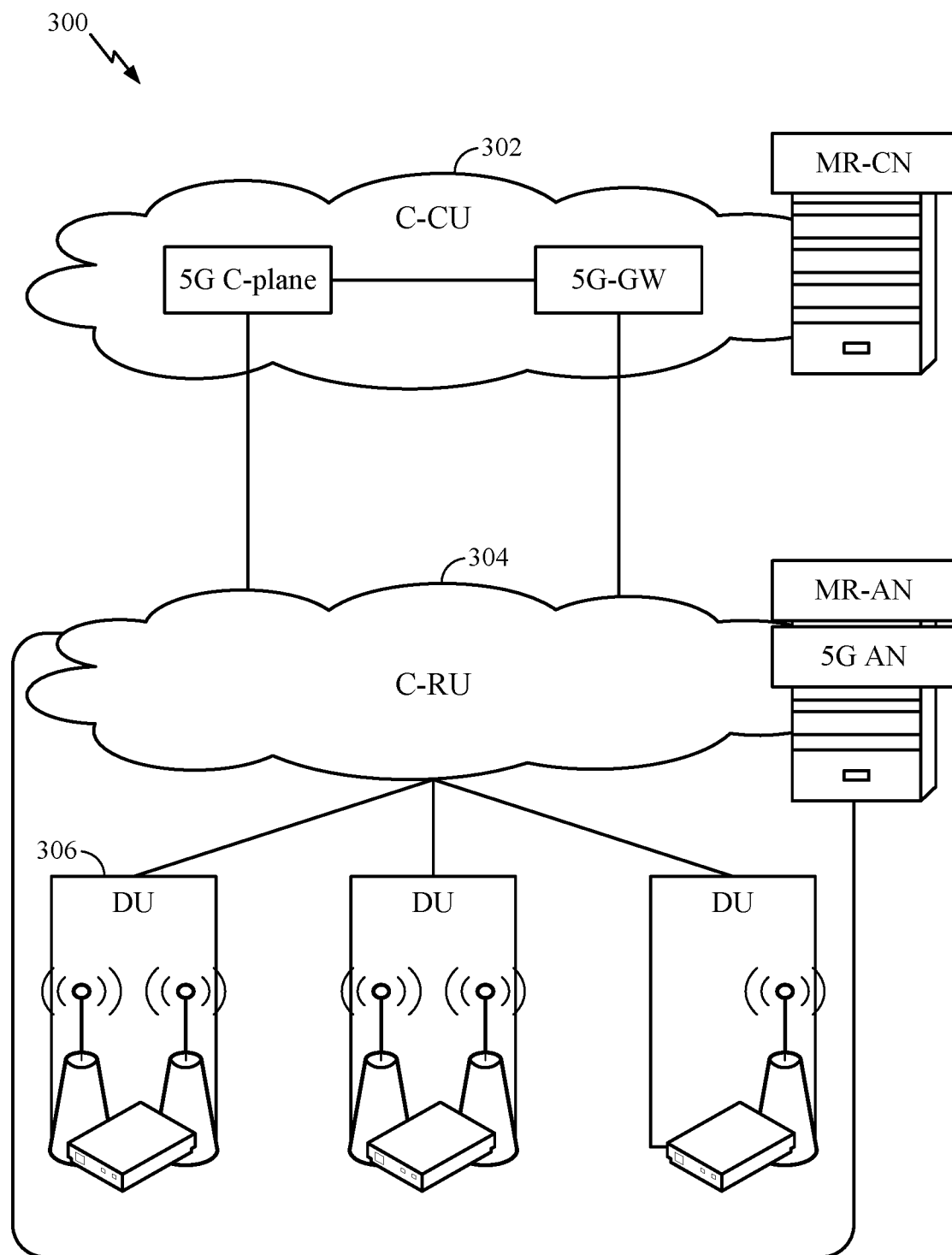
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
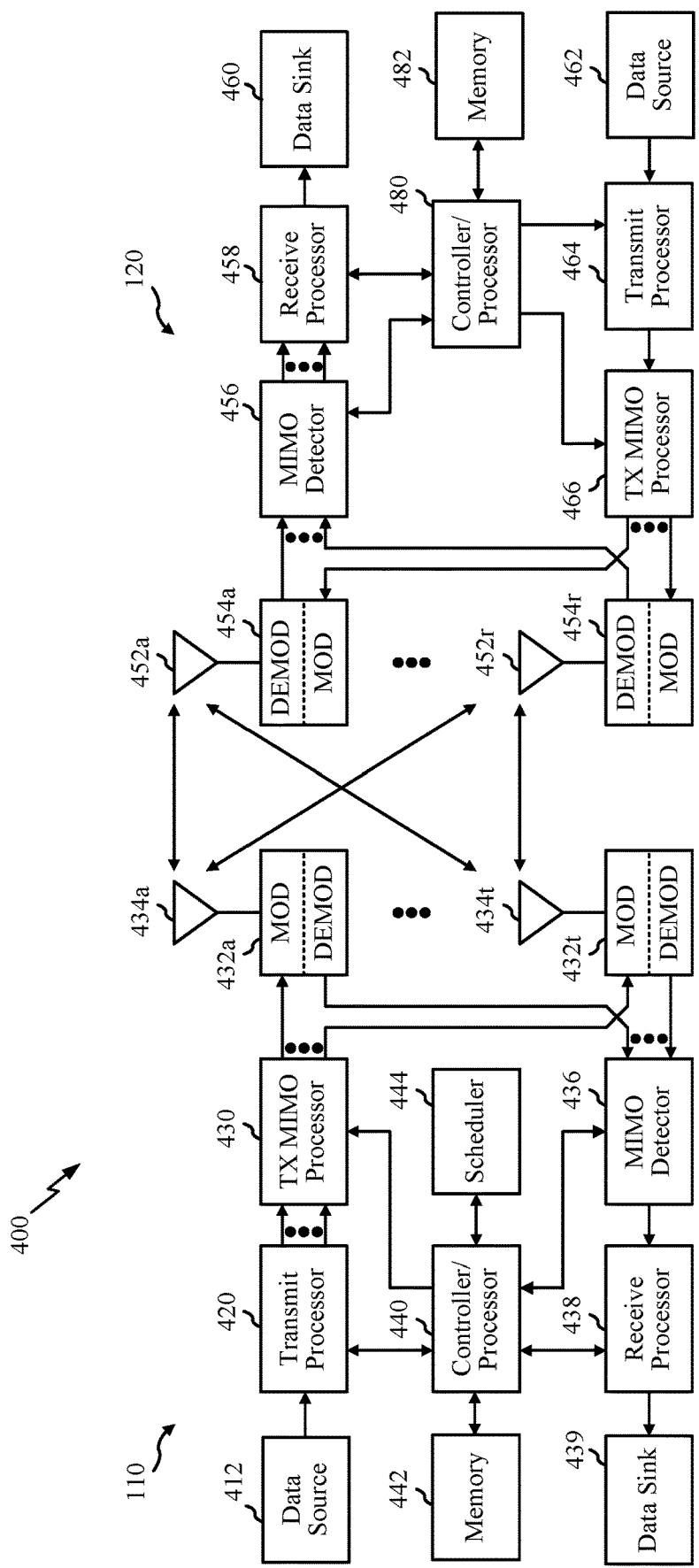
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be configured to perform the operations described herein and illustrated with reference to FIG. 11. According to an example, antennas 434, DEMOD/MOD 432, processors 430, 420, 438 and/or controller/processor 440 of the BS 110 may be configured to perform the operations described herein and illustrated with reference to FIG. 10.

As an example, one or more of the antennas 452, DEMOD/MOD 454, processors 466, 458, 464, and/or controller/processor 480 of the UE 120 may be configured to perform the operations described herein for beam monitoring during a CDRX cycle. Similarly, one or more of the 434, DEMOD/MOD 432, processors 430, 420, 438 and/or controller/processor 440 of the BS 110 may be configured to perform the operations described herein for configuring a UE 120 for beam monitoring during a CDRX cycle.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 11 and/or other processes for the techniques described herein and those illustrated in the appended drawings. The processor 440 and/or other processors and modules at the BS 110 may perform or direct e.g., the execution of the functional blocks illustrated in FIG. 10 and/or other processes for the techniques described herein and those illustrated in the appended drawings. The memories 442 and 482 may store data and program codes for the BS 110 and the UE 120, respectively.

Figure 5:
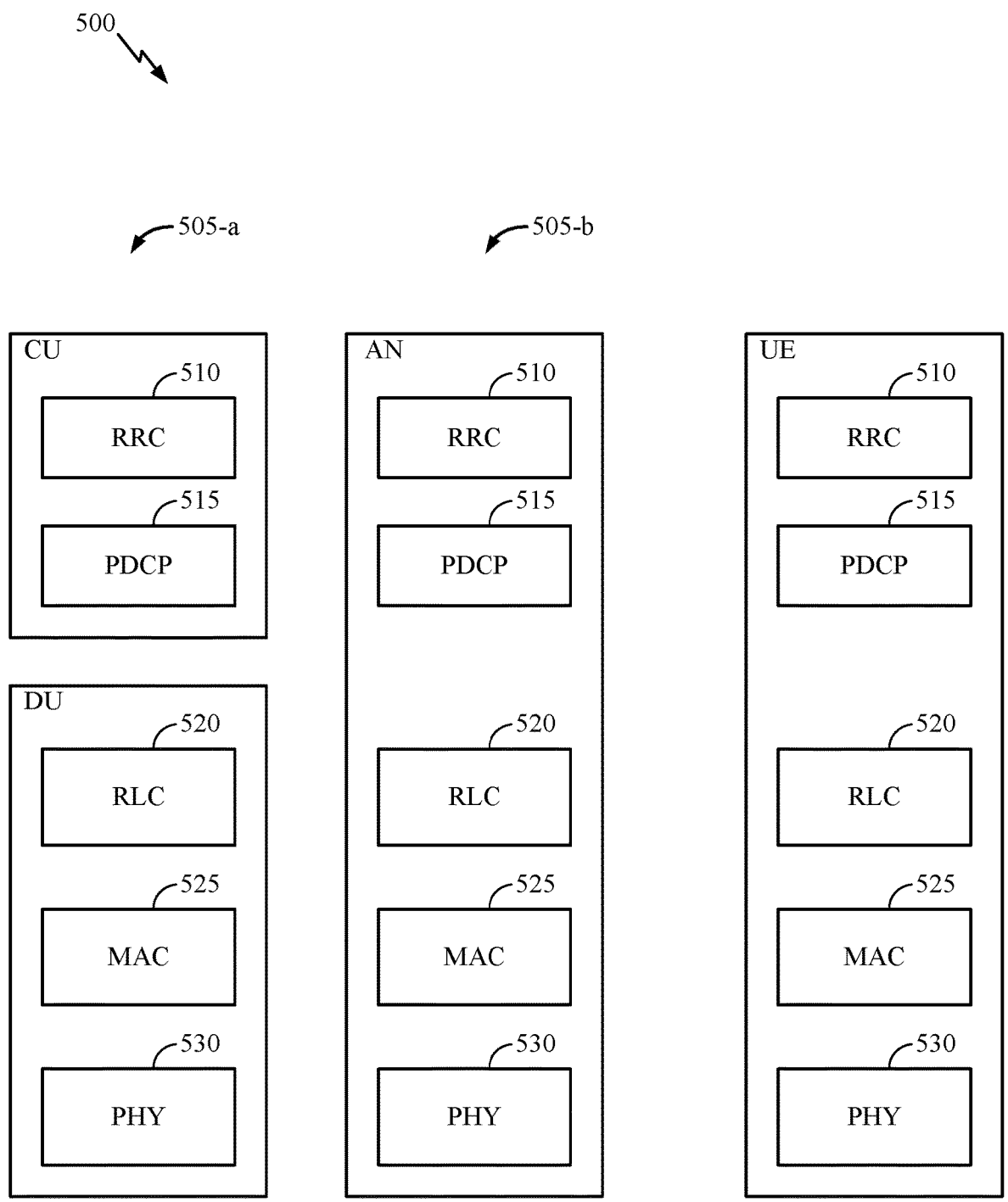
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
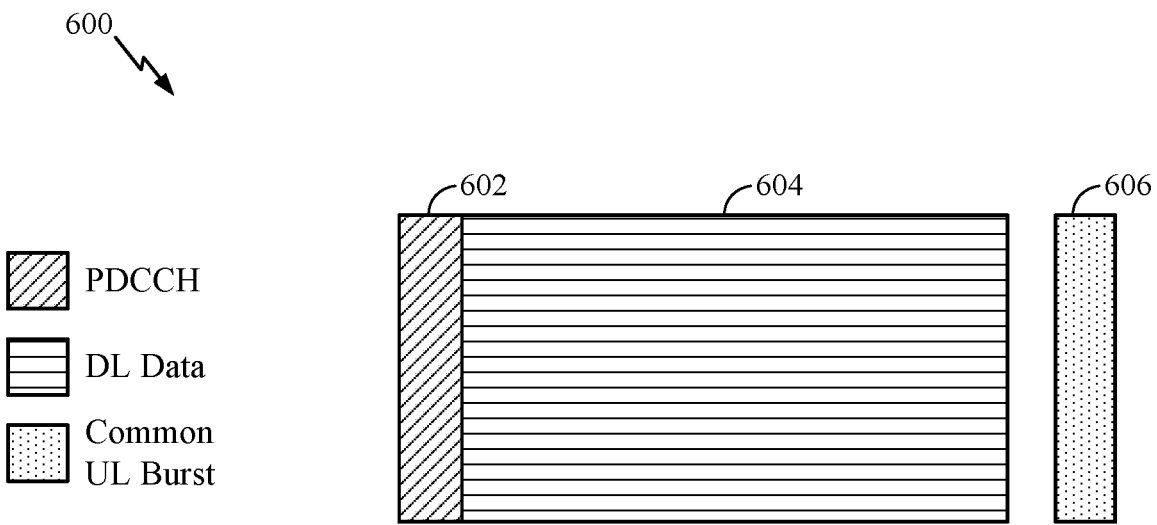
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
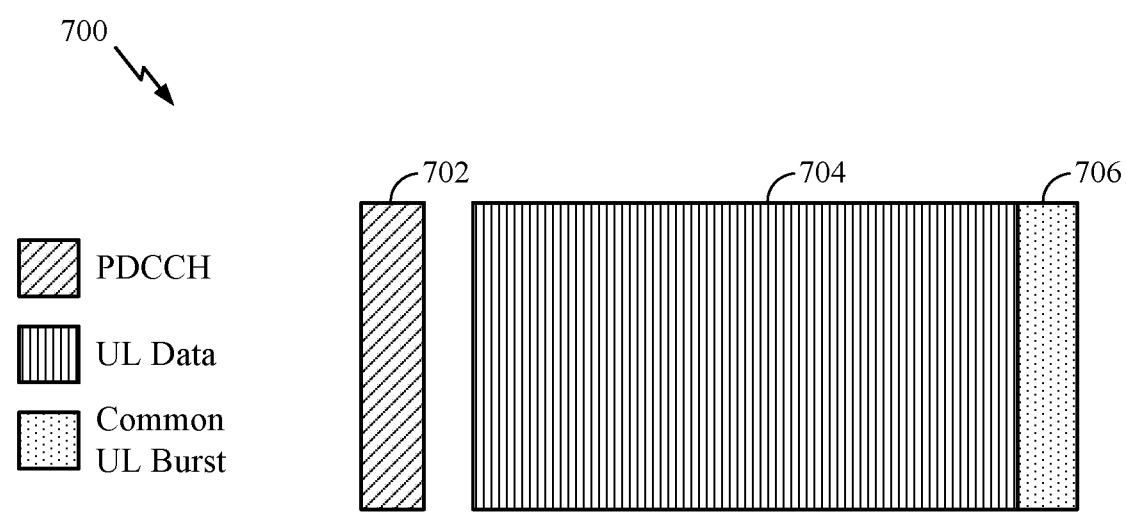
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedures

As noted above, in certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPs) or as fall-back BPLs in case an existing BPL fails.

The UE typically monitors the quality of a BPL and the network may refine a BPL from time to time.

FIG. 8 illustrates example 800 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 8, the BS 110 transmits different symbols of a reference signal, each beam formed in a different spatial direction such that several (most, all) relevant places of the cell are reached. Stated otherwise, the BS 110 transmits beams using different transmit beams over time in different directions.

For successful reception of at least a symbol of this "P1-signal", the UE 120 has to find an appropriate receive beam. It searches using available receive beams and applying a different UE-beam during each occurrence of the periodic P1-signal.

Once the UE 120 has succeeded in receiving a symbol of the P1-signal it has discovered a BPL. The UE 120 may not want to wait until it has found the best UE 120 receive beam, since this may delay further actions. The UE 120 may measure the reference signal receive power (RSRP) and report the symbol index together with the RSRP to the BS. Such a report will typically contain the findings of one or more BPLs.

In an example, the UE 120 may determine a received signal having a high RSRP. The UE 120 may not know which beam the BS 110 used to transmit, however, the UE 120 may report to the BS 110 the time at which it observed the signal having a high RSRP. The BS 110 may receive this report and may determine which BS beam the BS 110 used at the given time.

The BS may then offer P2 and P3 procedures to refine an individual BPL. The P2 procedure refines the BS-beam of a BPL. The BS 110 may transmit a few symbols of a reference signal with different BS-beams that are spatially close to the BS-beam of the BPL (the BS 110 performs a sweep using neighboring beams around the selected beam). In P2, the UE 120 keeps its beam constant. Thus, while the UE 120 uses the same beam as in the BPL (as illustrated in P2 procedure in FIG. 8). The BS-beams used for P2 may be different from those for P1 in that they may be spaced closer together or they may be more focused. The UE 120 may measure the RSRP for the various BS-beams and indicate the best one to the BS 110.

The P3 procedure refines the UE-beam of a BPL (see P3 procedure in FIG. 8). While the BS-beam stays constant, the UE 120 scans using different receive beams (the UE performs a sweep using neighboring beams). The UE 120 may measure the RSRP of each beam and identify the best UE-beam. Afterwards, the UE 120 may use the best UE-beam for the BPL and report the RSRP to the BS 110.

Overtime, the BS 110 and UE 120 establish several BPLs. When the BS 110 transmits a certain channel or signal, it lets the UE know which BPL will be involved, such that the UE 120 may tune in the direction of the correct UE 120 receive beam before the signal starts. In this manner, every sample of that signal or channel may be received by the UE 120 using the correct receive beam. In an example, the BS 110 may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS 110 may use a BPL which the UE 120 has received in the past. The transmit beam for the signal to be transmitted and the previously-received signal both point in a same direction or are QCL. The QCL indication may be needed by the UE 120 (in advance of signal to be received) such that the UE 110 may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

Example Beam Monitoring During CDRX Operation

Aspects of the present disclosure improve the robustness for control channel monitoring by a UE. A UE operating in an mmW system may move or change orientation between different ON portions of a CDRX operation. Accordingly, a receive beam used by a UE to monitor a downlink control channel (e.g., PDCCH) in a first ON period may need to be updated in a later-occurring ON period.

Figure 9:
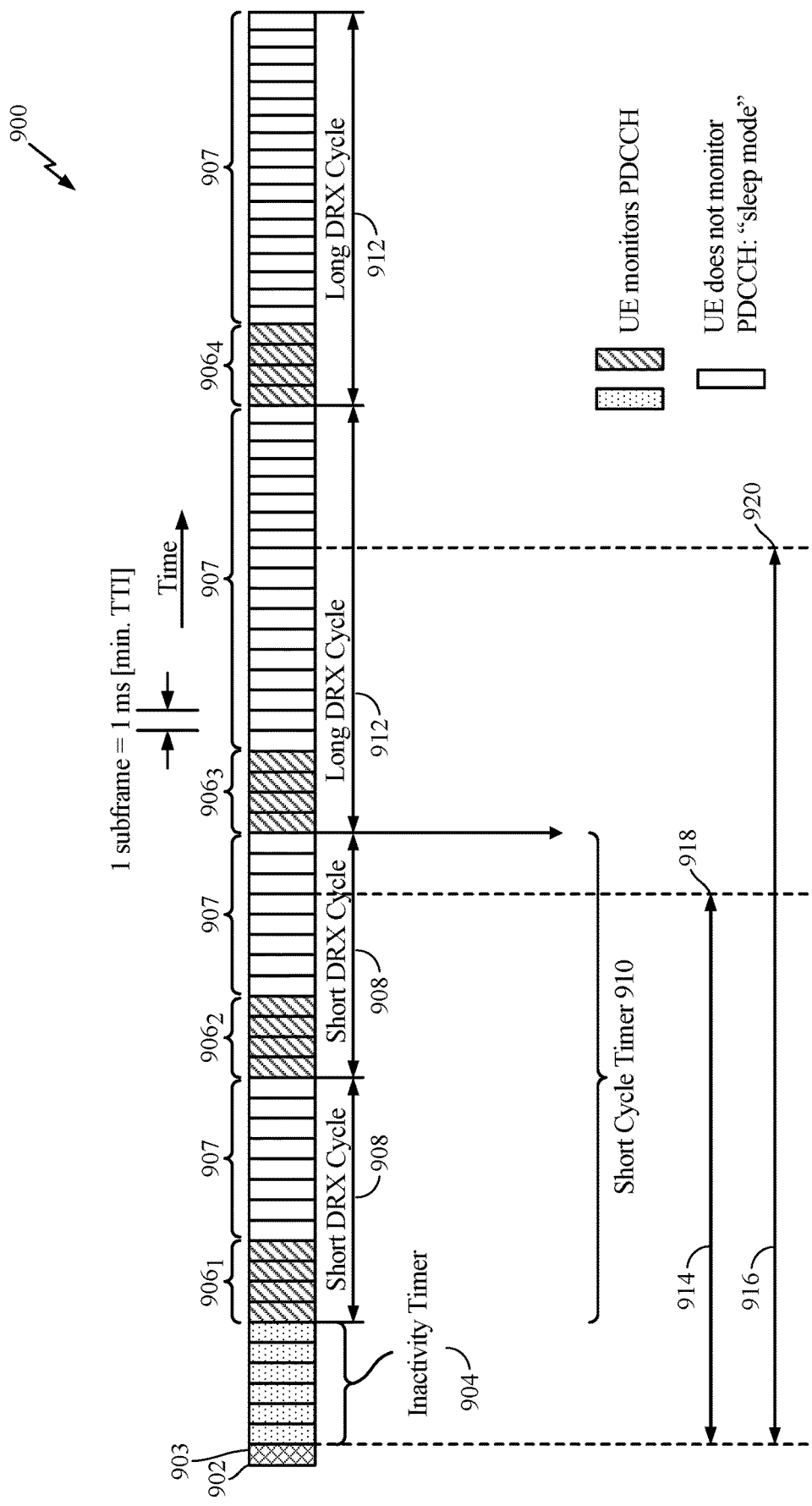
FIG. 9 illustrates example of CDRX including a short and long CDRX cycle.

FIG. 9 illustrates a CDRX configuration 900. The configuration 900 includes a number of short DRX cycles 908 and a number of long DRX cycles 912. According to an example, a long DRX cycle 912 may be 1.28 second and a short DRX cycle 908 may be 20 ms. During a short DRX cycle 908, the UE may be on for a certain period of time (shown as ON time 906) and go into sleep mode (shown as inactivity time 907). Newly arriving data may be delivered quickly because the UE only sleeps for short periods of time. Once a configurable amount of time expires (e.g., for example, as determined by the Short Cycle timer 910) during which no data was received during the short DRX mode, the UE may enter long DRX mode. During the long DRX mode, the UE saves more power but may experience increased latency as compared to the short DRX cycle 908. Because the UE wakes up more frequently in the short DRX mode, the short DRX mode may have a shorter periodicity as compared to the long DRX mode.

Thus, a UE configured for CDRX may enter a short DRX mode followed by a long DRX mode. The Short Cycle timer 910 may be expressed in multiples of Short Cycles, where Short Cycle may refer to a length of each short DRX cycle 908. Therefore, the Short Cycle Timer 910 indicates the number of initial DRX cycles to follow the short DRX cycle before entering the long DRX cycle.

As described above, ON times 906 are time periods during which the UE is active and monitors the downlink control channel. According to an example, time resource 902 (e.g., subframe) may correspond to when the UE is scheduled with its last grant (e.g., grant indicating initial uplink/downlink or sidelink user data transmission for this MAC entity). Immediately after time resource 902, at 903, the UE may start an inactivity timer 904 (from the last grant). After the inactivity timer 904 expires, the UE may enter the short DRX mode, during which one or more short DRX cycles 908 occur, until the Short Cycle Timer 910 expires. After the Short Cycle Timer 910 expires, the UE may enter a long DRX mode during which one or more long DRX cycles 912.

During a first ON period (e.g., $906_1$), the UE may monitor the downlink control channel (such as a PDCCH) using a first receive beam. If the UE moves or changes orientation from this ON period to a later ON period (e.g., $906_2$), the optimal transmit beam (used by the BS) may change. Accordingly, the UE may benefit from changing (updating) the receive beam used for monitoring the control channel. Accordingly, aspects of the present disclosure associate one or more beams to monitor by the UE as a function of the DRX cycle. Stated otherwise, based, at least in part, on a periodicity of the DRX cycle (e.g., short or long), the UE may be configured with one or more beams to monitor the downlink control channel.

The periodicity of the DRX cycle may be inferred based, at least in part, on a monitoring window, which may correspond to an amount of time that has passed since a last indication of an initial UL/DL or SL data transmission for the UE. Therefore, if an amount of time less than a threshold value has elapsed since the UE received its most recent indication of an initial UL/DL or SL data transmission for the UE, the UE may be operating in a short DRX cycle. For example, time period 914 corresponds to the amount of time that has elapsed since the UE's last grant in time resource 902. In that example, the threshold value may correspond to the aggregate of the inactivity timer 904 and the short cycle timer 910. Since time period 914 is less than the threshold value, then the UE is operating in a short DRX cycle, as shown.

If the amount of time is greater than or equal to the threshold value, the UE may be operating in a long DRX cycle. For example, time period 916 corresponds to the amount of time that has elapsed since the UE's last grant in time resource 902. In that example, the threshold value may correspond to the aggregate of the inactivity timer 904 and the short cycle timer 910. Since time period 916 is greater than the threshold value, then the UE is operating in a long DRX cycle, as shown.

For illustrative purposes, in one example, the threshold amount of time may be 1 ms. In this manner, the amount of time that has elapsed since the BS transmitted and the UE received the most recent uplink or downlink grant may indicate the CDRX periodicity.

According to an example, the monitoring window may correspond to the number of consecutive subframes since the last indication of an initial UL/DL or SL data transmission for the UE. In such an example, the number of consecutive subframes since the last indication of an initial UL/DL or SL data transmission for the UE may provide a proxy for the elapsed amount of time since the last indication, which may correspond to a certain periodicity of the DRX cycle. If the number of consecutive subframes is less than a threshold number of subframes, the UE may be operating in a short DRX cycle. If the number of consecutive subframes is greater than or equal to the threshold number of subframes, the UE may be operating in a long DRX cycle. For example, at point 918, the number of consecutive subframes since the last indication of an initial UL/DL or SL data transmission for the UE is 27 (corresponding to monitoring window 914). If the threshold number of subframes is 30, then at point 918, the UE is operating in the short DRX cycle. However, at point 920, the number of consecutive subframes since the last indication of an initial UL/DL or SL data transmission for the UE is 44 (corresponding to monitoring window 916), which is greater than the threshold number of subframes and, therefore, the UE is operating in the long DRX cycle.

Figure 10:
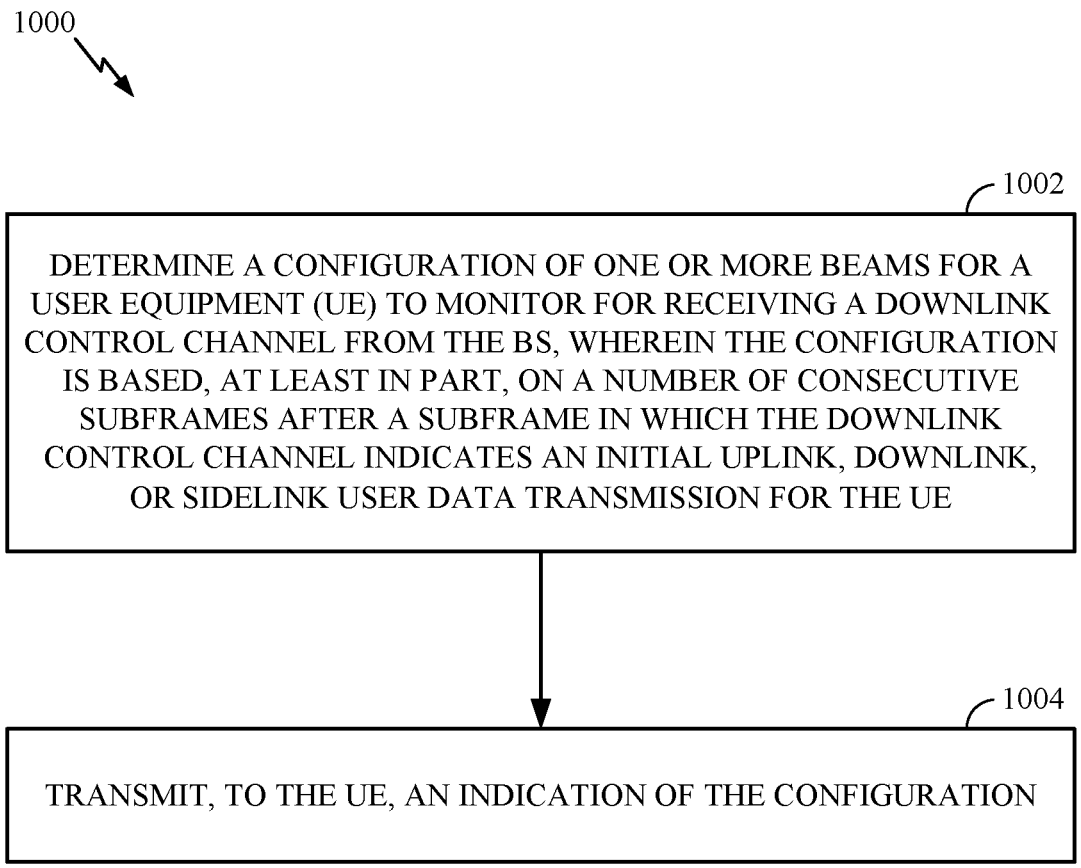
FIG. 10 illustrates example operations that may be performed by a BS, in accordance with certain aspects of the present disclosure.

FIG. 10 illustrates example operations 1000 that may be performed by a BS in communication with a UE participating in beamformed communications. The BS 110 may include one or more components as illustrated in FIG. 4.

At 1002, the BS may determine a configuration of one or more beams for a UE to monitor for receiving a downlink control channel from the BS, wherein the configuration is based, at least in part, on a number of consecutive subframes after a subframe in which the downlink control channel indicates an initial uplink, downlink, or sidelink user data transmission for the UE. At 1004, the BS may transmit, to the UE, an indication of the configuration.

Figure 10A:
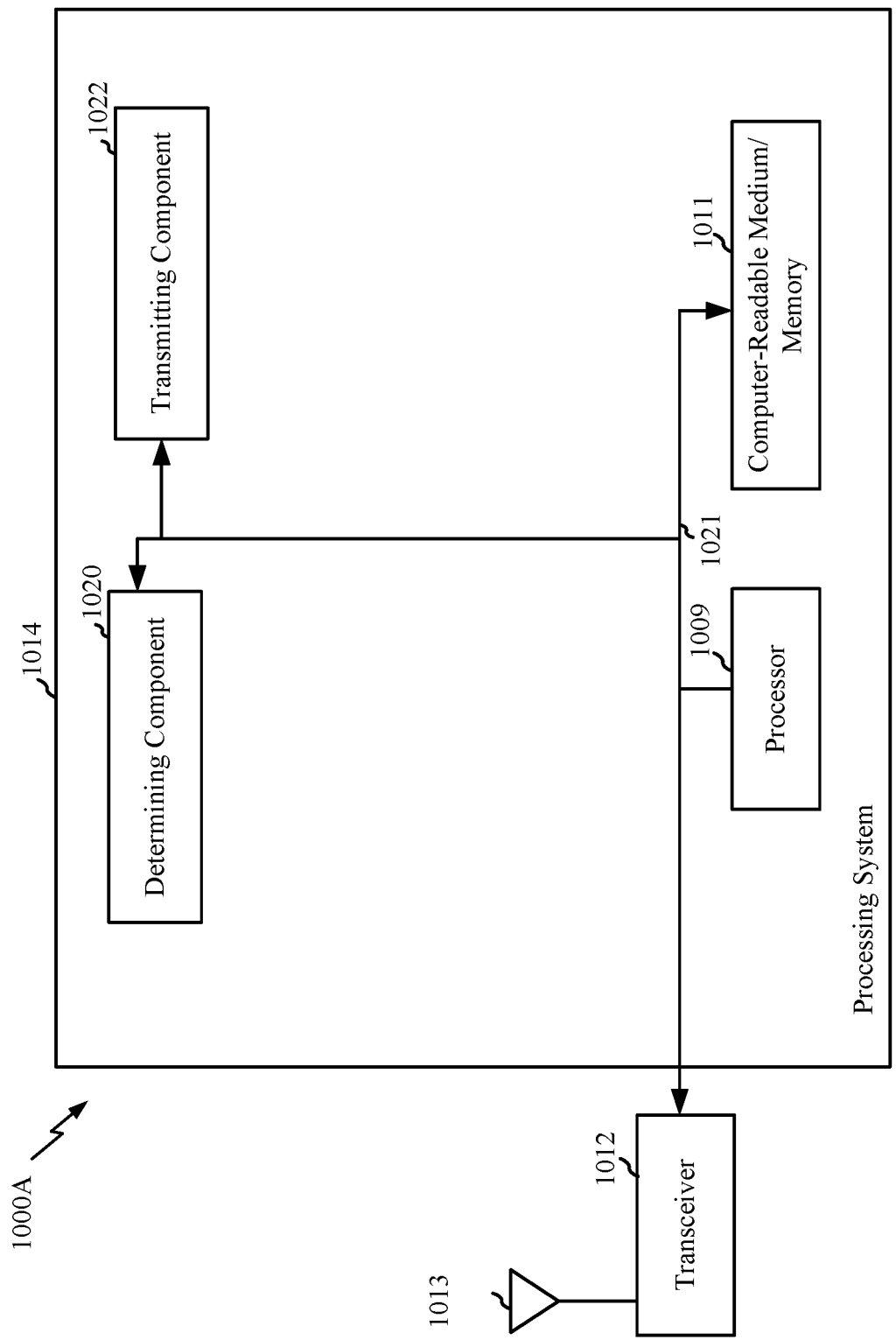
FIG. 10A illustrates a wireless communications device that may include various components configured to perform operations for the techniques disclosed herein, such as one or more of the operations illustrated in FIG. 10.

FIG. 10A illustrates a wireless communications device 1000A that may include various components (e.g., corresponding to means-plus-function components) configured to perform operations for the techniques disclosed herein, such as one or more of the operations illustrated in FIG. 10. The communications device 1000A includes a processing system 1014 coupled to a transceiver 1012. The transceiver 1012 is configured to transmit and receive signals for the communications device 1000A via an antenna 1013. The processing system 1014 may be configured to perform processing functions for the communications device 1000A, such as processing signals, etc.

The processing system 1014 includes a processor 1009 coupled to a computer-readable medium/memory 1011 via a bus 1021. In certain aspects, the computer-readable medium/memory 1011 is configured to store instructions that when executed by processor 1009, cause the processor 1009 to perform one or more of the operations illustrated in FIG. 10, or other operations for performing the various techniques discussed herein.

In certain aspects, the processing system 1014 further includes a determining component 1020 for performing one or more of the operations illustrated at 1002 in FIG. 10. Additionally, the processing system 1014 includes a transmitting component 1022 for performing one or more of the operations illustrated at 1004 in FIG. 10.

The determining component 1020 and the transmitting component 1022 may be coupled to the processor 1009 via bus 1021. In certain aspects, the determining component 1020 and the transmitting component 1022 may be hardware circuits. In certain aspects, the determining component 1020 and the transmitting component 1022 may be software components that are executed and run on processor 1009.

Figure 11:
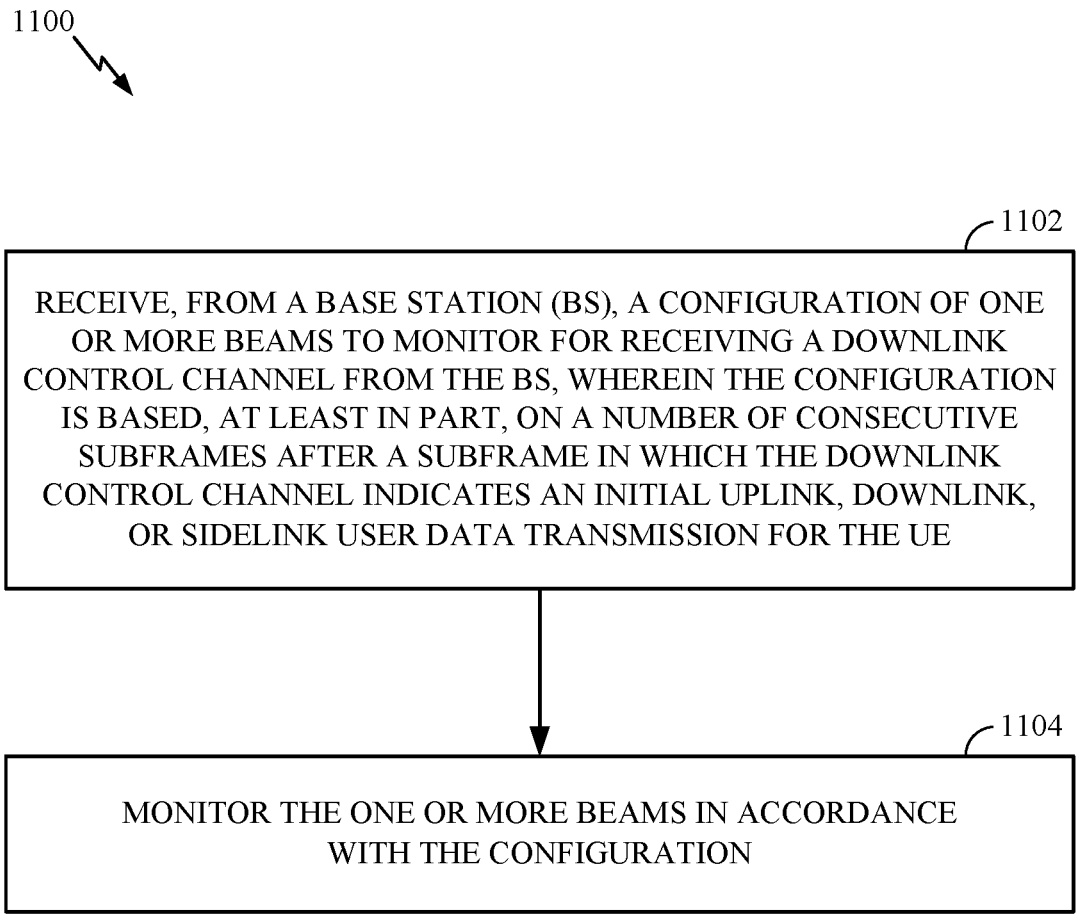
FIG. 11 illustrates example operations that may be performed by a UE, in accordance with certain aspects of the present disclosure.

FIG. 11 illustrates example operations 1100 that may be performed by a UE in communication with a BS participating in beamformed communications. The UE 120 may include one or more components as illustrated in FIG. 4.

At 1102, the UE may receive, from a BS, a configuration of one or more beams to monitor for receiving a downlink control channel from the BS, wherein the configuration is based, at least in part, on a number of consecutive subframes after a subframe in which the downlink control channel indicates an initial uplink, downlink, or sidelink user data transmission for the UE. At 1104, the UE may monitor the one or more beams in accordance with the configuration. The downlink control channel may be a PDCCH.

Figure 11A:
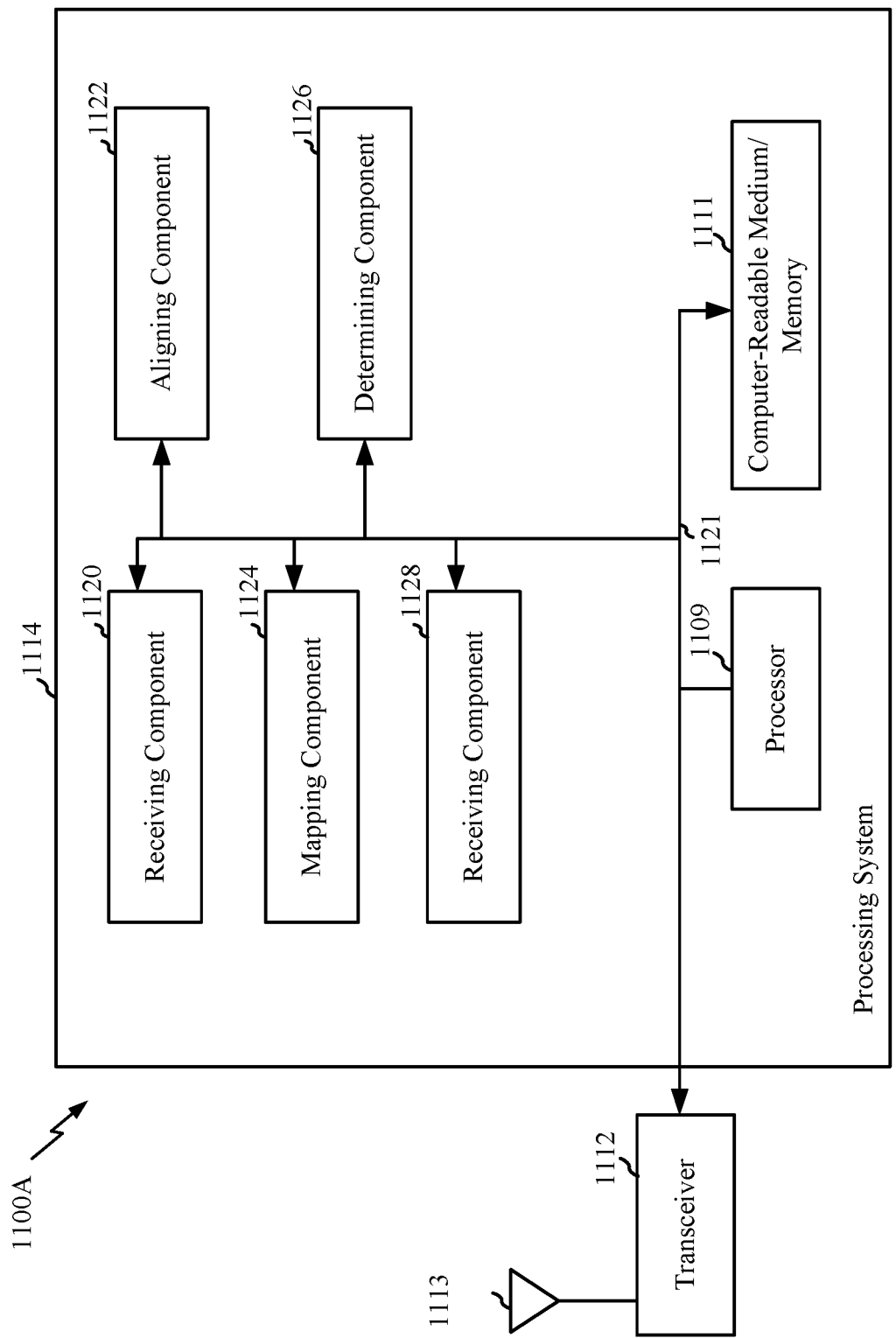
FIG. 11A illustrates a wireless communications device that may include various components configured to perform operations for the techniques disclosed herein, such as one or more of the operations illustrated in FIG. 11.

FIG. 11A illustrates a wireless communications device 1100A that may include various components (e.g., corresponding to means-plus-function components) configured to perform operations for the techniques disclosed herein, such as one or more of the operations illustrated in FIG. 11. The communications device 1100A includes a processing system 1114 coupled to a transceiver 1112. The transceiver 1112 is configured to transmit and receive signals for the communications device 1100A via an antenna 1113. The processing system 1114 may be configured to perform processing functions for the communications device 1100A, such as processing signals, etc.

The processing system 1114 includes a processor 1109 coupled to a computer-readable medium/memory 1111 via a bus 1121. In certain aspects, the computer-readable medium/memory 1111 is configured to store instructions that when executed by processor 1109, cause the processor 1109 to perform one or more of the operations illustrated in FIG. 11, or other operations for performing the various techniques discussed herein.

In certain aspects, the processing system 1114 further includes a receiving component 1120 for performing one or more of the operations illustrated at 1102 in FIG. 11. Additionally, the processing system 1114 includes a monitoring component 1122 for performing one or more of the operations illustrated at 1104 in FIG. 11.

The receiving component 1120 and the monitoring component 1122 may be coupled to the processor 1109 via bus 1121. In certain aspects, the receiving component 1120 and the monitoring component 1122 may be hardware circuits. In certain aspects, the receiving component 1120 and the monitoring component 1122 may be software components that are executed and run on processor 1109.

According to aspects, one or more beams may be associated with a CDRX periodicity. Thus, certain one or more beams may be associated with a short CDRX cycle while another one or more beams may be associated with a long CDRX cycle. The UE may be configured to monitor multiple beams in each of the long or short CDRX cycles. As noted above, a monitoring window, which may correspond to an amount of time that has elapsed since the last uplink/downlink or SL grant, may be used to determine which configuration of beams to use. The amount of elapsed time may provide an indication of whether the UE is operating in a short or long CDRX cycle. As described above, in certain aspects, the monitoring window may correspond to the number of consecutive subframes after the subframe in which the PDCCH indicates an initial UL/DL or SL user data transmission for the UE. The number of consecutive subframes after the subframe in which the PDCCH indicates an initial UL/DL or SL user data transmission for the UE may provide an indication of the elapsed amount of time.

According to an example, in a long CDRX cycle and/or when the elapsed amount of time or the number of consecutive subframes since the initial UL/DL or SL user data is greater than or equal to a threshold value or a threshold number of subframes, respectively, the UE may be configured to monitor synch signal (SS) beams and/or P1 beams. Thus, the UE may be configured to monitor coarse beams. It may be advantageous to monitor coarse beams (wider beams) because of the long sleep period and/or long time since a last received grant. For example, the UE had more time to move and/or change orientation.

According to an example, in a short CDRX cycle and/or when the elapse amount of time or the number of consecutive subframes since the initial UL/DL or SL user data is less than a threshold value or a threshold number subframes, respectively, the UE may be configured to monitor P2/P3 beams and/or refined beams. Because of the short sleep cycles and/or small amount of time since a last received grant, the UE may be configured to monitor P2/P3 or refined beams (narrower beams).

According to aspects, the UE may be configured to monitor multiple beams for the downlink control channel in each of the CDRX periods and/or based on an amount of elapsed time (or number of consecutive subframes) since the subframe in which the PDCCH indicated the initial uplink, downlink, or sidelink user data transmission for the UE. The UE may be configured to use certain beams in certain time periods. As an example, the UE may be configured to use one or more configured beams in even slots and another one or more configured beams in odd slots based on the CDRX periodicity/time from a last received grant. Using different beams in even and odd slots is only one example of how the UE may use different beams at different times in each of the short and long CDRX cycles.

According to one example, the BS transmits a configuration indication to the UE. The BS indicates that the UE use SS Beam 5 for next ON time of a Long DRX cycle and CSI-RS P2 beam 4 (from a CSI-RS resource indicator (CRI) and UE report) to monitor next on time of a short DRX cycle. The UE may receive this indication during an ON time of the long DRX cycle. The UE may then enter a short DRX cycle and use a receive beam corresponding to CSI-RS P2 beam 4 to monitor during the short DRX cycle. The UE may use the receive beam corresponding to SS Beam 5 for the long DRX cycle (e.g., for all the ON times of all the long DRC cycles).

According to another example, the BS indicates to the UE to use CSI-RS P1 Beam 5 and SS Beam 6 for next ON time of a long DRX cycle and CSI-RS P2 beam 4 (from CRI and UE report) to monitor next ON time of a short DRX cycle. The BS may indicate that Beam 5 should be monitored on even slots and SS Beam 6 should be monitored on odd slots of the long DRX cycle. The UE may receive a similar timing configuration associated with the configured beams for the short DRX cycle. In accordance with the configuration, the UE uses the correct receive beam to monitor PDCCH based on the CDRX periodicity/time.

The configuration may be signaled via any combination of radio resource control (RRC) signaling, a media access control (MAC) channel element (CE), and downlink control information (DCI).

Figure 12:
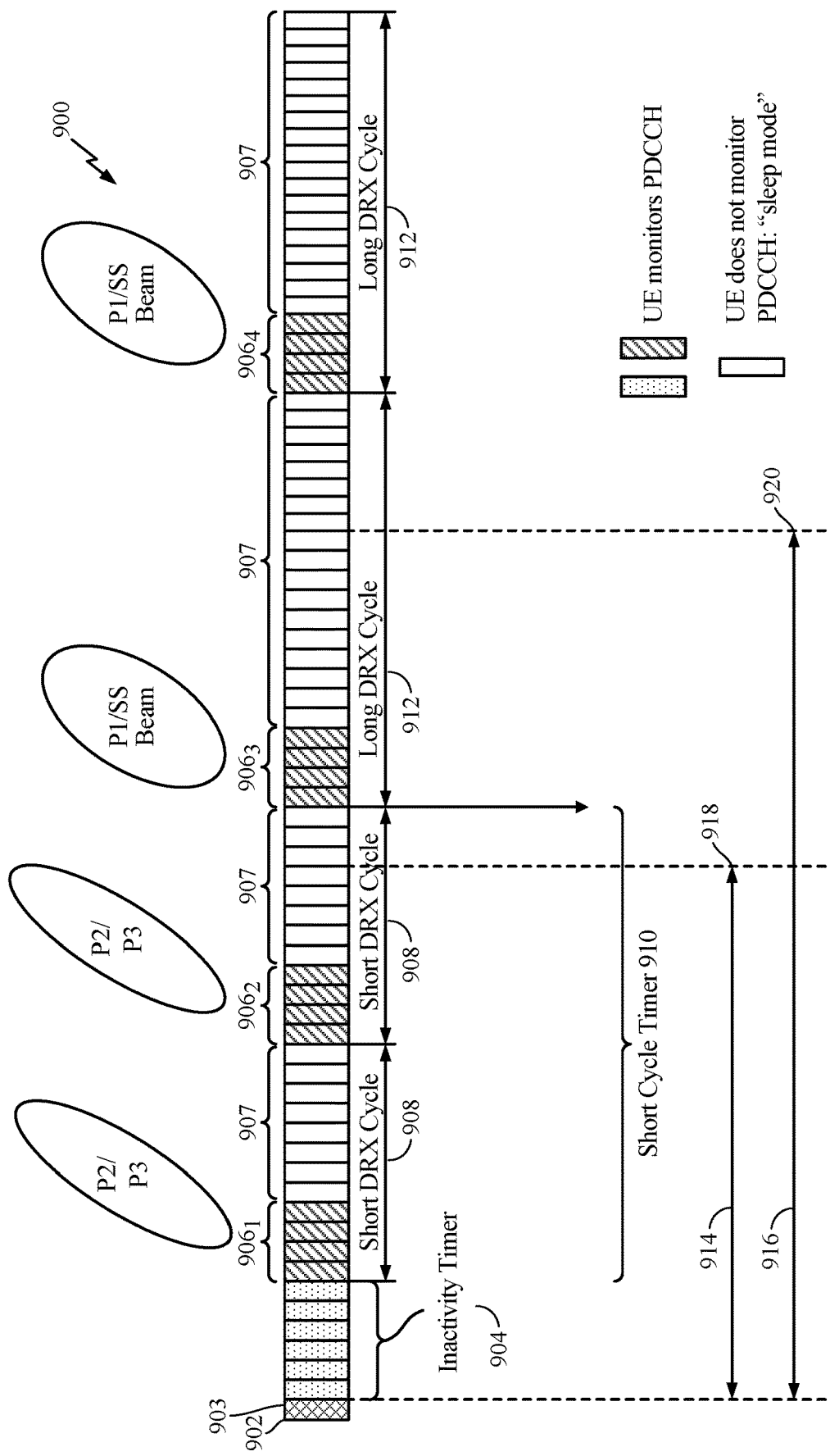
FIG. 12 illustrates an example multibeam PDCCH monitoring, in accordance with certain aspects of the present disclosure.

FIG. 12 illustrates an example of multibeam PDCCH monitoring 1200, in accordance with aspects of the present disclosure. As illustrated, during the short CDRX cycles, the UE may monitor P2/P3 or refined beams. During the long CDRX cycles, the UE may monitor P1/SS beams. Thus, the UE may monitor wider beams during the long CDRX cycles as compared to the short CDRX cycles. According to another example, after a threshold amount of time or a threshold number of consecutive subframe from the last subframe in which a downlink control channel indicates an initial uplink, downlink, or sidelink user data transmission for the UE, the UE may switch from a first beam configuration pattern to a second beam configuration pattern. The first beam configuration pattern may include P2/P3 refined beams and the second beam configuration pattern may include P1/SS, coarse beams.

In accordance with aspects of the present disclosure, a BS may configure a UE with one or more beams to monitor based on a CDRX periodicity. The CRDX periodicity may be determined based on a monitoring window, which may correspond to the amount of elapsed time of an initial UL/DL or SL data transmission for the UE or a number of consecutive subframes after a subframe in which a downlink control channel indicates an initial uplink, downlink, or sidelink user data transmission for the UE.

Based on the configuration, the UE may select an appropriate receive beam to receive a PDCCH. Thus, aspects described herein improve the likelihood the UE will receive the PDCCH.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS), comprising:
 determining a configuration of one or more beams for a user equipment (UE) to monitor for receiving a subsequent downlink control channel from the BS, wherein the configuration is based, at least in part, on a monitoring window, wherein the monitoring window corresponds to a time elapsed from the UE receiving an indication in a downlink control channel for an initial uplink, downlink, or sidelink user data transmission for the UE; and
 transmitting, to the UE, an indication of the configuration, wherein:
  the one or more beams comprise at least one of:
   a first set of one or more beams for the UE to monitor when the monitoring window is less than a threshold, and a second set of one or more beams for the UE to monitor when the monitoring window is greater than or equal to the threshold;
   a first set of one or more beams for the UE to monitor during a short connected mode discontinuous reception (CDRX) cycle, and a second set of one or more beams for the UE to monitor during a long CDRX cycle, wherein the short CDRX cycle occurs after a shorter duration than the long CDRX cycle;
   one or more P2 or P3 beams transmitted by the BS when the monitoring window is less than a second threshold; or
   one or more P1 or synchronization signal beams transmitted by the BS when the monitoring window is greater than or equal to the second threshold.

2. The method of claim 1, wherein the monitoring window is associated with a periodicity, and wherein determining the configuration is based on the periodicity.

3. The method of claim 1, wherein the monitoring window includes a number of consecutive subframes.

4. The method of claim 1, wherein the one or more beams comprise:
 the first set of one or more beams for the UE to monitor when the monitoring window is less than the threshold; and
 the second set of one or more beams for the UE to monitor when the monitoring window is greater than or equal to the threshold.

5. The method of claim 1, wherein the one or more beams comprise:
 the first set of one or more beams for the UE to monitor during the short CDRX cycle; and
 the second set of one or more beams for the UE to monitor during the long CDRX cycle.

6. The method of claim 1, wherein the monitoring window comprises a number of time slots, and wherein the configuration comprises:
 an indication of which of the one or more beams to monitor in each time slot of the number of time slots.

7. The method of claim 1, wherein the one or more beams comprise:
the one or more P2 or P3 beams transmitted by the BS when the monitoring window is less than the second threshold.

8. The method of claim 1, wherein the one or more beams comprise:
the one or more P1 or synchronization signal beams transmitted by the BS when the monitoring window is greater than or equal to the second threshold.

9. The method of claim 1, wherein transmitting the indication comprises:
transmitting using at least one of radio resource control (RRC) signaling, a media access control (MAC) control element (CE), or downlink control information.

10. An apparatus, comprising:
a non-transitory memory comprising executable instructions; and
a processor in data communication with the memory and configured to execute the instructions to cause the apparatus to:
determine a configuration of one or more beams for a user equipment (UE) to monitor for receiving a subsequent downlink control channel from the apparatus, wherein the configuration is based, at least in part, on a monitoring window, wherein the monitoring window corresponds to a time elapsed from the UE receiving an indication in a downlink control channel for an initial uplink, downlink, or sidelink user data transmission for the UE; and
transmit, to the UE, an indication of the configuration, wherein:
the one or more beams comprise at least one of:
a first set of one or more beams for the UE to monitor when the monitoring window is less than a threshold, and a second set of one or more beams for the UE to monitor when the monitoring window is greater than or equal to the threshold;
a first set of one or more beams for the UE to monitor during a short connected mode discontinuous reception (CDRX) cycle, and a second set of one or more beams for the UE to monitor during a long CDRX cycle, wherein the short CDRX cycle occurs after a shorter duration than the long CDRX cycle;
one or more P2 or P3 beams transmitted by the apparatus when the monitoring window is less than a second threshold; or
one or more P1 or synchronization signal beams transmitted by the apparatus when the monitoring window is greater than or equal to the second threshold.

11. The apparatus of claim 10, wherein the monitoring window is associated with a periodicity, and wherein the configuration is determined based on the periodicity.

12. The apparatus of claim 10, wherein the one or more beams comprise:
the first set of one or more beams for the UE to monitor during the short CDRX cycle; and
the second set of one or more beams for the UE to monitor during the long CDRX cycle.

13. A method for wireless communication by a user equipment (UE), comprising:
receiving, from a base station (BS), a configuration of one or more beams to monitor for receiving a subsequent downlink control channel from the BS, wherein the configuration is based, at least in part, on a monitoring window, wherein the monitoring window corresponds to a time elapsed from the UE receiving an indication in a downlink control channel for an initial uplink, downlink or sidelink user data transmission for the UE; and
monitoring the one or more beams in accordance with the configuration, wherein:
the one or more beams comprise at least one of:
a first set of one or more beams for the UE to monitor when the monitoring window is less than a threshold, and a second set of one or more beams for the UE to monitor when the monitoring window is greater than or equal to the threshold;
a first set of one or more beams for the UE to monitor during a short connected mode discontinuous reception (CDRX) cycle, and a second set of one or more beams for the UE to monitor during a long CDRX cycle, wherein the short CDRX cycle occurs after a shorter duration than the long CDRX cycle;
one or more P2 or P3 beams transmitted by the BS when the monitoring window is less than a second threshold; or
one or more P1 or synchronization signal beams transmitted by the BS when the monitoring window is greater than or equal to the second threshold.

14. The method of claim 13, wherein the monitoring window is associated with a periodicity, and wherein determining the configuration is based on the periodicity.

15. The method of claim 13, wherein the monitoring window includes a number of consecutive subframes.

16. The method of claim 13, wherein the one or more beams comprise:
the first set of one or more beams for the UE to monitor when monitoring window is less than the threshold; and
the second set of one or more beams for the UE to monitor when the monitoring window is greater than or equal to the threshold.

17. The method of claim 13, wherein the one or more beams comprise:
the first set of one or more beams for the UE to monitor during the short CDRX cycle; and
the second set of one or more beams to monitor during the long CDRX cycle.

18. The method of claim 13, wherein the monitoring window comprises a number of time slots, and wherein the configuration comprises:
an indication of which of the one or more beams to monitor in each time slot of the number of time slots.

19. The method of claim 13, wherein the one or more beams comprise:
the one or more P2 or P3 beams transmitted by the BS when the monitoring window is less than the second threshold.

20. The method of claim 13, wherein the one or more beams comprise:
the one or more P1 or synchronization signal beams transmitted by the BS when the monitoring window is greater than or equal to the second threshold.

21. The method of claim 13, wherein the receiving comprises:
receiving the indication using at least one of radio resource control (RRC) signaling, a media access control (MAC) control element (CE), or downlink control information.

22. An apparatus, comprising:
a non-transitory memory comprising executable instructions; and
a processor in data communication with the memory and configured to execute the instructions to cause the apparatus to:
receive, from a base station (BS), a configuration of one or more beams to monitor for receiving a subsequent downlink control channel from the BS, wherein the configuration is based, at least in part, on a monitoring window, wherein the monitoring window corresponds to a time elapsed from the apparatus receiving an indication in a downlink control channel for an initial uplink, downlink or sidelink user data transmission for the apparatus; and
monitor the one or more beams in accordance with the configuration, wherein:
the one or more beams comprise at least one of:
a first set of one or more beams for the apparatus to monitor when the monitoring window is less than a threshold, and a second set of one or more beams for the apparatus to monitor when the monitoring window is greater than or equal to the threshold;
a first set of one or more beams for the apparatus to monitor during a short connected mode discontinuous reception (CDRX) cycle, and a second set of one or more beams for the apparatus to monitor during a long CDRX cycle, wherein the short CDRX cycle occurs after a shorter duration than the long CDRX cycle;
one or more P2 or P3 beams transmitted by the BS when the monitoring window is less than a second threshold; or
one or more P1 or synchronization signal beams transmitted by the BS when the monitoring window is greater than or equal to the second threshold.

23. The apparatus of claim 22, wherein the monitoring window is associated with a periodicity, and wherein determining the configuration is based on the periodicity.

24. The apparatus of claim 22, wherein the configuration comprises:
the first set of one or more beams for the apparatus to monitor during the short CDRX cycle; and
the second set of one or more beams for the apparatus to monitor during the long CDRX cycle.

* * * * *